United States Patent [19]
Cutler

[11] 4,425,653
[45] Jan. 10, 1984

[54] ATOMIC BEAM DEVICE USING OPTICAL PUMPING

[75] Inventor: Leonard S. Cutler, Los Altos Hills, Calif.

[73] Assignee: Hewlett-Packard Company, Palo Alto, Calif.

[21] Appl. No.: 164,980

[22] Filed: Jul. 1, 1980

[51] Int. Cl.³ .................................. H01S 3/091
[52] U.S. Cl. ............................. 372/70; 372/37
[58] Field of Search ............ 331/94.5 P, 94.5 PE, 331/94

[56] References Cited
PUBLICATIONS

Gerritsen et al., Multidirectional Doppler pumping: A new method to prepare an atomic beam having a large fraction of excited atoms. Appl. Phys. Lett., vol. 26, No. 6 (15 Mar. 1975) pp. 347–349.

Primary Examiner—William L. Sikes
Assistant Examiner—Leon Scott, Jr.
Attorney, Agent, or Firm—John A. Frazzini

[57] ABSTRACT

A method and apparatus are disclosed for optically pumping the atoms of an atomic beam into a single trap state. An atomic beam is produced and is passed through a region of weak magnetic field to produce a magnetic splitting of energy levels. The beam is illuminated with a laser beam to produce selected excitations. The spectral distribution of the laser light is selected (1) to excite the atoms of the atomic beam to excited levels from which the atoms can decay into the trap state and (2) to avoid exciting atoms out of the trap state. Particular applications of the method and apparatus are described for atomic or ionic clocks and masers.

12 Claims, 5 Drawing Figures

ATOMIC BEAM DEVICE USING OPTICAL PUMPING

BACKGROUND OF THE INVENTION

This invention relates generally to atomic or ionic devices and, more particularly, to atomic beam devices employing optical pumping to increase the populations of selected states. The advantages of such population enhancement are illustrated by consideration of a cesium clock which employs an atomic beam of cesium.

In cesium, the nucleus has spin 7/2 which combines with the spin ½ of the valence electron to produce ground energy level (i.e., $6^2S_{\frac{1}{2}}$) states of total angular momentum $F=3$ and $F=4$. These states have a difference in energy that can be used to produce a very accurate clock signal. The energy of the sublevels of these hyperfine states as a function of applied magnetic field is shown in FIG. 1. For zero applied field the states separate into two hyperfine states of seven $F=3$ sublevels and nine $F=4$ sublevels. These states differ in energy by the hyperfine energy difference. For a strong applied magnetic field the states separate into two groups of eight sublevels: (1) a group of $F=4$ sublevels with $m_F=-3, -2, \ldots, +4$ which increase in energy with increase in applied field and (2) a group of sublevels with $F=3$ and with $F=4$ and $m_F=-4$ which decrease in energy with increase in applied field.

In the cesium tube shown in FIG. 2 the energy difference between the atomic states of cesium is used to produce a very accurate and stable clock frequency (see Hyatt, et al., "A High Performance Beam Tube for Cesium Beam Frequency Standards", *Hewlett-Packard Journal*, September 1973, p. 14–24). An oven and collimator are employed to produce a beam of cesium atoms which, because of the small energy difference between the $F=3$ and $F=4$ states, are roughly evenly distributed among the sixteen $6^2S_{\frac{1}{2}}$ sublevels. The beam passes first through a strong inhomogeneous magnetic "A" field. It then goes through a microwave cavity in a weak homogeneous magnetic "C" field region. Next it goes through a second strong inhomogeneous magnetic field, the "B" field and finally goes to the detector. The oven, "A" magnet, and "B" magnet are so arranged and fitted with beam stops that only atoms originally in the $F=3$, all sublevels, and the $F=4$ $m_F=-4$ sublevel entering the "A" magnet can get through the "B" magnet gap. The detector is placed so that only atoms in the $F=4$ $m_F=-3, -2, -1, 0, 1, 2, 3, 4$ states entering the "B" magnet will be detected. Therefore, in the absence of RF excitation of the microwave cavity, no atoms will be detected.

The weak homogeneous magnetic "C" field is about 0.09 Gauss to produce a weak field splitting of the energies of the group of $F=3$ sublevels and of the group of $F=4$ sublevels (see FIG. 1). An rf source provides an rf field in the cavity to induce transitions from the $F=3$ $m_F=0$ state to the $F=4$ $m_F=0$ state. The number of transitions is maximized when the rf frequency equals the transition frequency corresponding to the energy difference between the $6^2S_{\frac{1}{2}}$ $F=3$ $m_F=0$ state and the $6^2S_{\frac{1}{2}}$ $F=4$ $m_F=0$ state. These atoms will now be deflected by the "B" magnet into the detector which provides an amplified signal proportional to the number of atoms striking it per second. This signal is used to regulate a voltage controlled crystal oscillator (VCXO) to produce an output signal of precisely regulated frequency (in the cesium clock shown in FIG. 2 this frequency is 5 MHz). The 5 MHz signal is supplied to an output for use as a clock signal. The 5 MHz signal is also supplied to an rf source to produce a frequency modulated rf field of carrier frequency equal to the transition frequency. In the cesium clock of FIG. 2 the modulation frequency is 137 Hz and the carrier frequency is about 9192.631774 MHz.

Because of the frequency modulation, the detector signal has a 137 Hz component when the rf carrier frequency strays from the transition frequency. The detector signal is applied to a synchronous detector to produce a directional error signal proportional to the 137 Hz component of the detector signal. The error signal is applied to an integrator which provides an integrated error signal used to control the VCXO to produce a 5 MHz signal.

For high gain in the feedback loop from the detector to the VCXO, the accuracy of the 5 MHz output signal becomes that of the cesium beam tube. The fractional amount of noise introduced into the 5 MHz signal by the cesium tube decreases with increased beam flux to the detector. Because essentially only those atoms reach the detector which leave the oven in the $6^2S_{\frac{1}{2}}$ $F=3$ $m_F=0$ state and are excited to the $6^2S_{\frac{1}{2}}$ $F=4$ $m_F=0$ state, fifteen-sixteenths of the beam leaving the oven is not utilized. A significant improvement in signal noise can thus be achieved by a scheme which transfers a major fraction of the atoms leaving the oven into the $6^2S_{\frac{1}{2}}$ $F=3$ $m_F=0$ (or $F=4$ $m_F=0$) state before passing through the microwave cavity.

SUMMARY OF THE INVENTION

In accordance with the illustrated preferred embodiment an oven and collimator are employed to produce an atomic beam. The beam passes through a region of weak magnetic field to produce a weak field splitting of the atomic energy levels. The beam is illuminated in the weak field region by a laser beam or beams having a set of frequencies and polarizations selected to produce transitions between selected states. The induced transitions are selected to pump atoms into excited states which can spontaneously decay into the desired final state. The frequencies and polarizations of the laser beam are also selected to avoid inducing transitions out of the desired final state so that the final state is a trap into which essentially all of the atoms decay.

The disclosed invention puts essentially all the atoms in the beam into the desired state before interaction with the rf field. For the same number of atoms emitted from the oven this will produce a 16-fold increase in the detector signal compared to the prior art clock shown in FIG. 2. There is an additional increase in signal due to the wide velocity acceptance of the disclosed method. The main velocity limitation is that atoms which do not remain in the laser beam long enough to be excited and decay a large number of times will have a reduced chance of winding up in the trap state. For typical oven temperature, laser beam intensity and laser beam cross section the thermal spread in velocities will have only a small effect on the fraction of atoms reaching the trap state. In contrast, the prior technique illustrated in FIG. 2 requires a limited spread in velocities because the deflection of atoms by the strong magnetic "A" and "B" fields is velocity dependent as well as state dependent. This increase in useful beam density improves the signal to noise ratio of the detector signal. A further advantage of the disclosed method is that it allows elimination of the strong magnetic "A" field which can disturb the accuracy and precision of the clock by adding a stray non-homogeneous magnetic field to the weak homogeneous magnetic "C" field. The "B" field can also be eliminated by using optical pumping for detection, if desired.

DESCRIPTION OF THE PREFERRED EMBODIMENT

Figure 3:
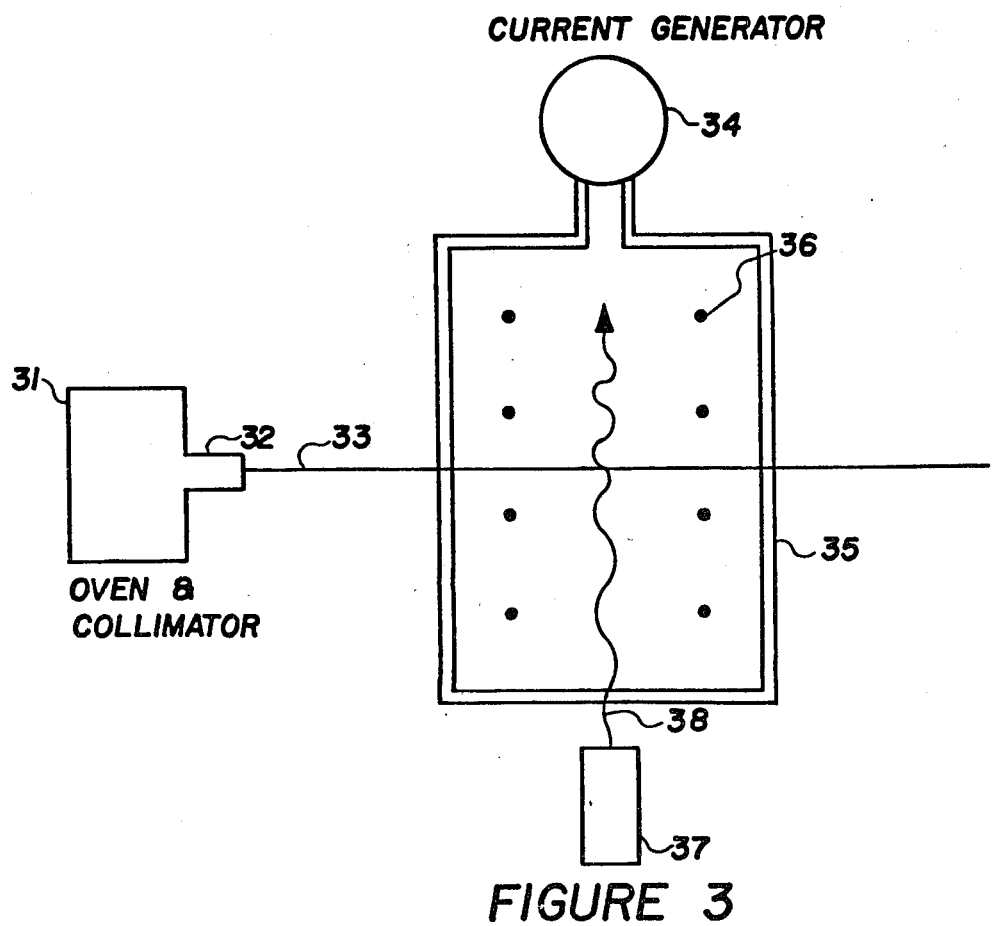
FIG. 3 illustrates a preferred embodiment of the disclosed invention for producing an atomic beam having essentially all of its atoms in a single atomic state.

In FIG. 3 is shown an apparatus for producing an atomic beam having all of its atoms in a single atomic state. An atomic source, such as cesium, is vaporized in an oven 31 to produce a gas. The cesium vapor passes through a collimator 32 to produce an atomic beam 33 of cesium atoms. Because of the elevated temperature of the oven and the small energy difference between the sixteen $6^2S_{\frac{1}{2}}$ energy states, these sixteen states are nearly equally populated.

Figure 1:
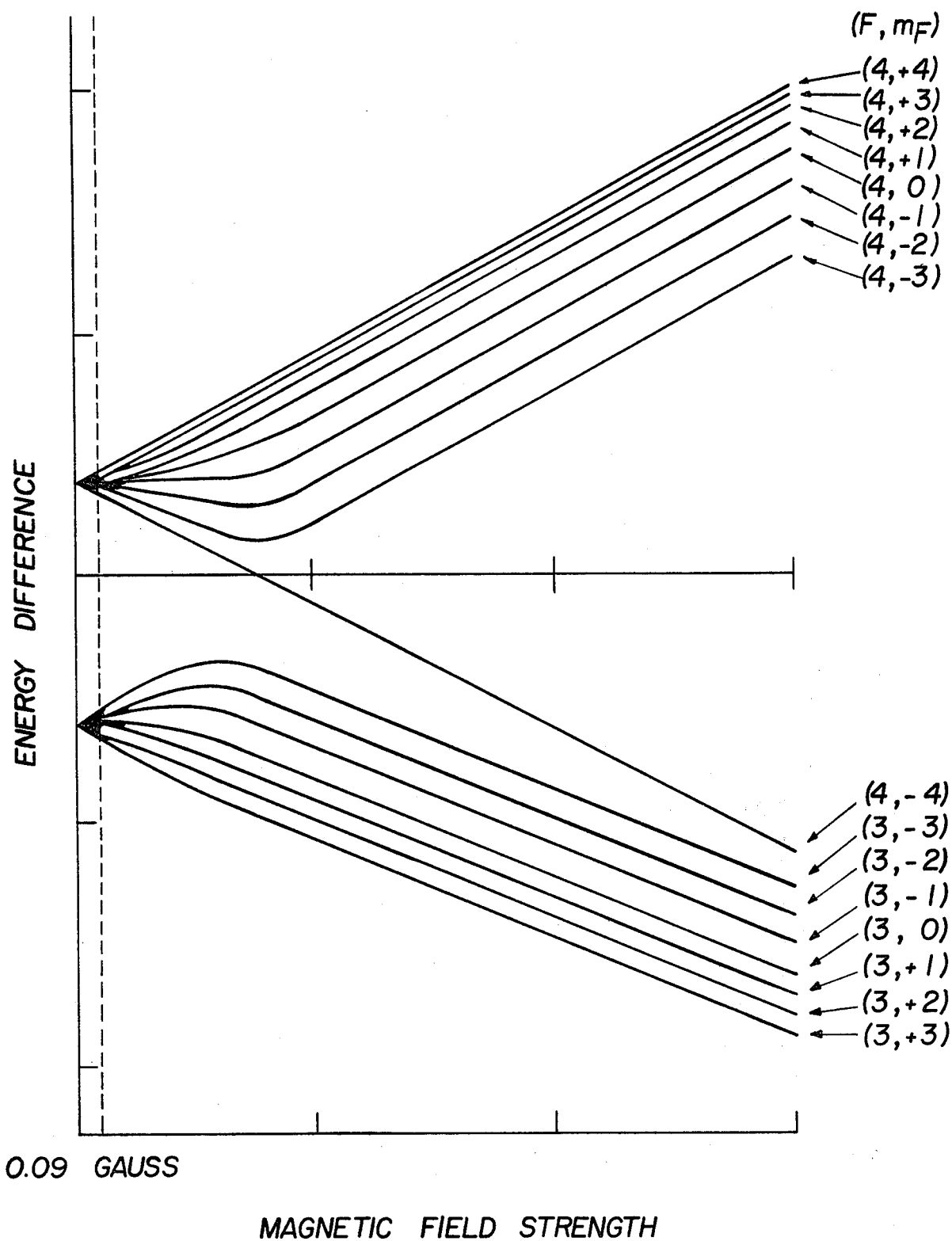
FIG. 1 shows the energy level splitting of the sixteen cesium atom $6^2S_{\frac{1}{2}}$ states as a function of applied magnetic field.
Figure 4:
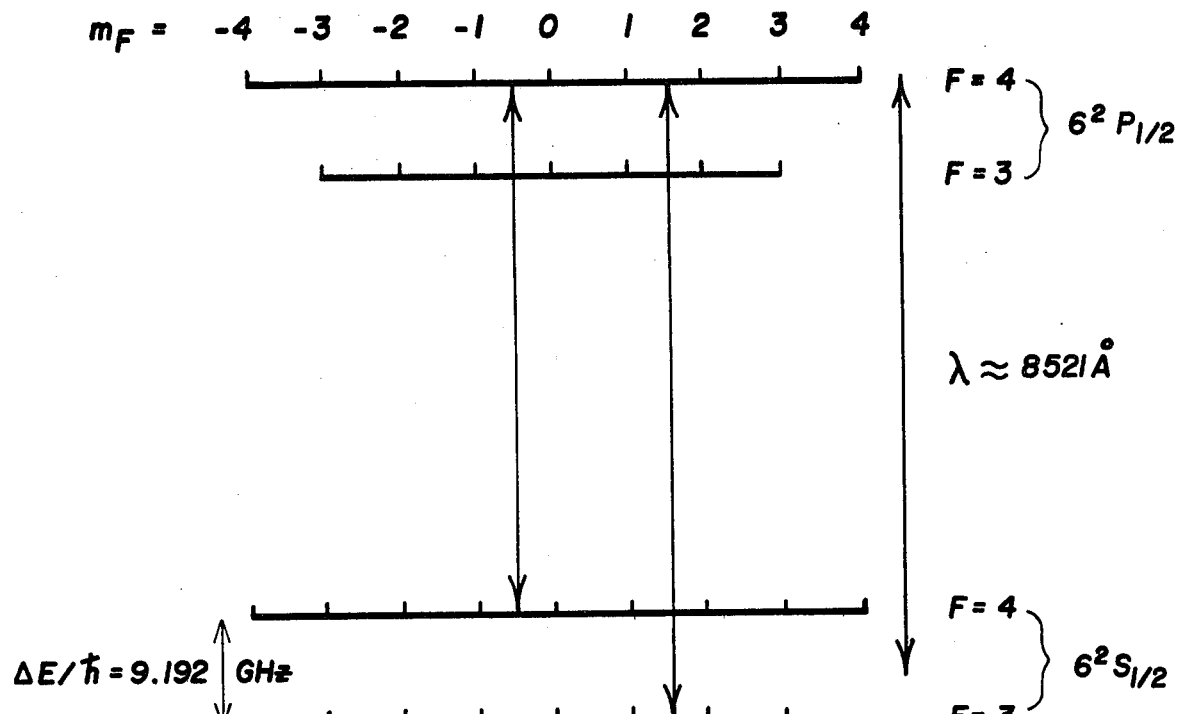
FIG. 4 illustrates the atomic transitions employed in accordance with the embodiment disclosed in FIG. 3.

Essentially all of the atoms in beam 33 are shifted into the $6^2S_{\frac{1}{2}}$ F=4 $m_F=0$ energy state by the technique of optical pumping. (See Gerritsen and Nienhuis, "Miltidirectional Doppler Pumping: A New Method to Prepare an Atomic Beam Having a Large Fraction of Excited Atoms", *Applied Physics Letters*, Vol. 26, No. 6, Mar. 15, 1975, p. 347 for an optical pumping application.) To accomplish this optical pumping, a d.c. current generator 34 drives current through a coil 35 to produce a weak magnetic field 36 through which beam 33 is directed. The magnetic field produces a magnetic splitting of the sixteen energy levels. The amount of splitting is shown in FIG. 1 as a function of increasing magnetic field. A laser 37 illuminates atomic beam 33 with a laser beam 38 of light which is plane polarized in the direction parallel to magnetic field 36. Laser beam 38 has two frequencies of light selected to pump from both F levels of the $6^2S_{\frac{1}{2}}$ ground energy level to the F=4 states of the $6^2P_{\frac{1}{2}}$ excited energy level (see FIG. 4). Magnetic field 36 is selected to be weak enough that the spread in energy sublevels due to the weak field splitting is less than the spectral width of the laser lines so that the two laser lines will induce transitions from all sixteen $6^2S_{\frac{1}{2}}$ states into the $6^2P_{\frac{1}{2}}$ F=4 states.

The selection rules for induced transitions due to light which is plane polarized parallel to magnetic field 36 allow only transitions obeying $\Delta F = -1, 0, 1$ and $\Delta m_F = 0$. However, no $\Delta F = 0$, $\Delta m_F = 0$ transition is allowed from an $m_F = 0$ state. Therefore, there will be no laser induced transitions out of the $6^2S_{\frac{1}{2}}$ F=4 $m_F = 0$ state. Spontaneous emissions, however, are allowed for $\Delta m_F = -1, 0, 1$ so that atoms can decay from the $6^2P_{\frac{1}{2}}$ F=4 states into the $6^2S_{\frac{1}{2}}$ F=4 $m_F = 0$ state. This state therefore acts as a trap into which essentially all of the atoms in beam 33 fall. Perturbations, such as atomic collisions and stray fields can produce unwanted transitions out of the trap state. Magnetic field 36 is therefore selected to be large enough that the energy separation between the trap state and adjacent states is large enough that the characteristic time of such a transition is much longer than the transit time of the atomic beam through the laser beam.

The $m_F = 0$ state is a particularly useful trap state because time standards such as a cesium clock typically use a transition with $\Delta m_F = 0$ between $m_F = 0$ states. The reason for this is that this transition frequency has the smallest magnetic field dependence. For weak magnetic fields the frequency f corresponding to a transition varies as $f = f_o + am_F B + bB^2$. In a cesium clock, typical values of a and b are $a \approx 7 \times 10^5$ Hertz/Gauss and $b \approx 427$ Hertz/(Gauss)$^2$. The energies of the $m_F = 0$ states are thus less sensitive to variation of the magnetic "C" field in the cesium tube. Therefore, the beam is selected to enter in the F=4 $m_F = 0$ state and the polarization and frequency of the rf field is selected to induce transitions to the F=3 $m_F = 0$ state.

The choice of laser 37 is restricted by only a few requirements. The laser must be tunable to and produce the two frequencies selected for use in the optical pumping scheme or two lasers may be used. Also, the laser line width must be less than the hyperfine splitting between the energy levels into which the atoms are excited. If this latter requirement were violated in the example discussed above, the laser line which excites atoms out of the $6^2S_{\frac{1}{2}}$ F=4 level would excite atoms to the $6^2P_{\frac{1}{2}}$ F=3 level as well as the $6^2P_{\frac{1}{2}}$ F=4 level. This laser would therefore excite atoms out of the $6^2S_{\frac{1}{2}}$ F=4 $m_F = 0$ state so that this state would not serve as a trap. For increased power efficiency, the laser should be plane polarizeable, but this is not essential. Alternatively, at a loss of up to half of the laser output, the plane polarized laser beam can be produced by passing an unpolarized or circularly polarized beam through a conventional polarizer.

The laser should produce a laser beam having a cross section which is wide enough that the entire atomic beam passes through the laser beam. The height of the cross section must be large enough that the atoms in the atomic beam remain within the laser beam for many spontaneous decay half-lifes to enable essentially all of the atoms to reach the trap state. However, because the typical velocity of an atomic beam is on the order of $10^4$ cm/sec and a spontaneous decay half-life is on the order of 10 nsec, this requirement should not limit the choice of laser. The laser should also be powerful enough that the average time required to excite a laser illuminated ground state atom is much shorter than the time required for the atom to pass through the laser beam. This level of intensity is required to enable enough transitions that essentially all of the atoms will reach the trap state. A laser having at least a few milliwatts power rating should be adequate. In the example discussed above, the laser was selected to be a 50 milliwatt continuous wave dye laser using HITC dye pumped with krypton. In an alternate embodiment in which the cesium atoms are excited into the F=4 states of the $7^2P_{\frac{1}{2}}$ excited energy level, the required light of approximately 4555 A wavelength can be obtained using Cumarin dye pumped with krypton.

The two laser lines can be obtained by modulating the laser to produce sidebands. For a laser of frequency $f_c$ and modulation frequency $f_m$, the spectral distribution of the laser light has components at $f_c - f_m$, $f_c$ and $f_c + f_m$.

The modulation of the laser light can be amplitude modulation, phase modulation, or a combination of amplitude and phase modulation. The required pair of laser lines can therefore be provided by using any two of these three lines and selecting $f_c$ and $f_m$ to produce the frequencies required for the transition scheme of FIG. 4. The pair of laser frequencies can alternatively be obtained by employing two lasers, each providing one of the selected frequencies.

The disclosed method is not limited to use only in cesium clocks. Clearly, the same techniques apply to any atomic or ionic clock or device requiring atoms or ions in a single ground level state. Indeed the method applies to any composite particle (i.e., a bound state of more than one particle; for example an atom is a bound state of protons, neutrons and electrons) having energy states between which transitions can be induced by optical pumping. Thus, the relevant atoms or ions will sometimes be referred to in the present specification and claims as "particles". For example, the method also can be applied to masers. In masers, a beam of atoms in an excited state is passed through a microwave cavity to amplify the signal in the cavity via stimulated emission of radiation or to provide stable oscillation. This technique of optical pumping can also be applied in non-beam type atomic devices to pump atoms or ions into a single ground state.

The method is also more general than the single example discussed above might indicate. The primary criteria in selecting polarizations and spectral distribution of the laser light are: (1) low energy atoms are to be excited to levels from which the atoms can decay into the trap state and (2) there are to be no laser induced transitions out of the trap state. For example, in FIG. 4, the atoms in the $6^2S_{\frac{1}{2}}$ F=3 level could alternatively be excited to the $6^2P_{\frac{1}{2}}$ F=3 level since the states in that level can decay to the $6^2S_{\frac{1}{2}}$ F=4 level by spontaneous emission. However, to avoid exciting atoms out of the $6^2S_{\frac{1}{2}}$ F=4 $m_F$=0 trap state, the excitations from the $6^2S_{\frac{1}{2}}$ F=4 level must be only to levels having F=4 and the light must be plane polarized along the direction of the magnetic field. Unfortunately, this alternate embodiment also produces a $6^2S_{\frac{1}{2}}$ F=3 $m_F$=0 trap state.

Figure 2:
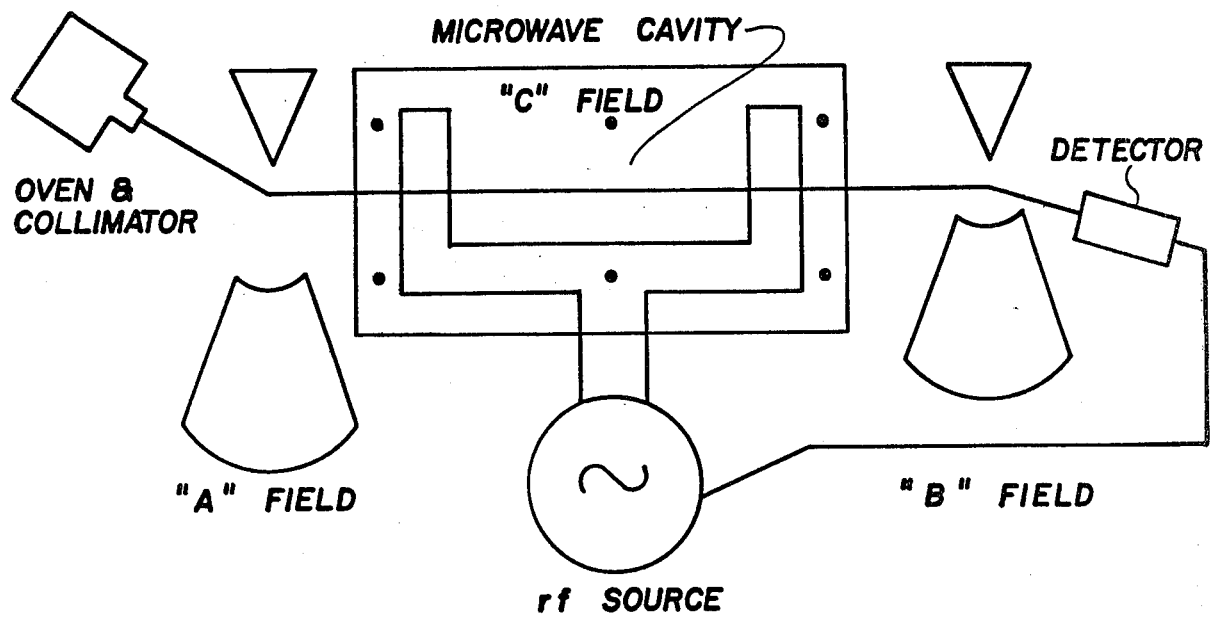
FIG. 2 illustrates the structure of a typical cesium clock known in the prior art.

When the method is used in conjunction with an atomic clock such as the cesium clock of FIG. 2, the magnetic "A" field is eliminated and replaced by the combination of the weak magnetic field and laser. The magnetic field is oriented parallel to the "C" field of the cesium beam tube so that the state into which the atoms are pumped is an $m_F$=0 state relative to the direction of the "C" field. In addition, the detector is shifted to intercept the part of the beam deflected toward the strong field region of the "B" field. Thus, in contrast to the cesium clock of FIG. 2, the cesium clock employing the optical pumping scheme operates to direct cesium atoms in the $6^2S_{\frac{1}{2}}$ F=4 $m_F$=0 state into the cesium beam tube cavity and to induce these atoms into the $6^2S_{\frac{1}{2}}$ F=3 $m_F$=0 state.

Figure 5:
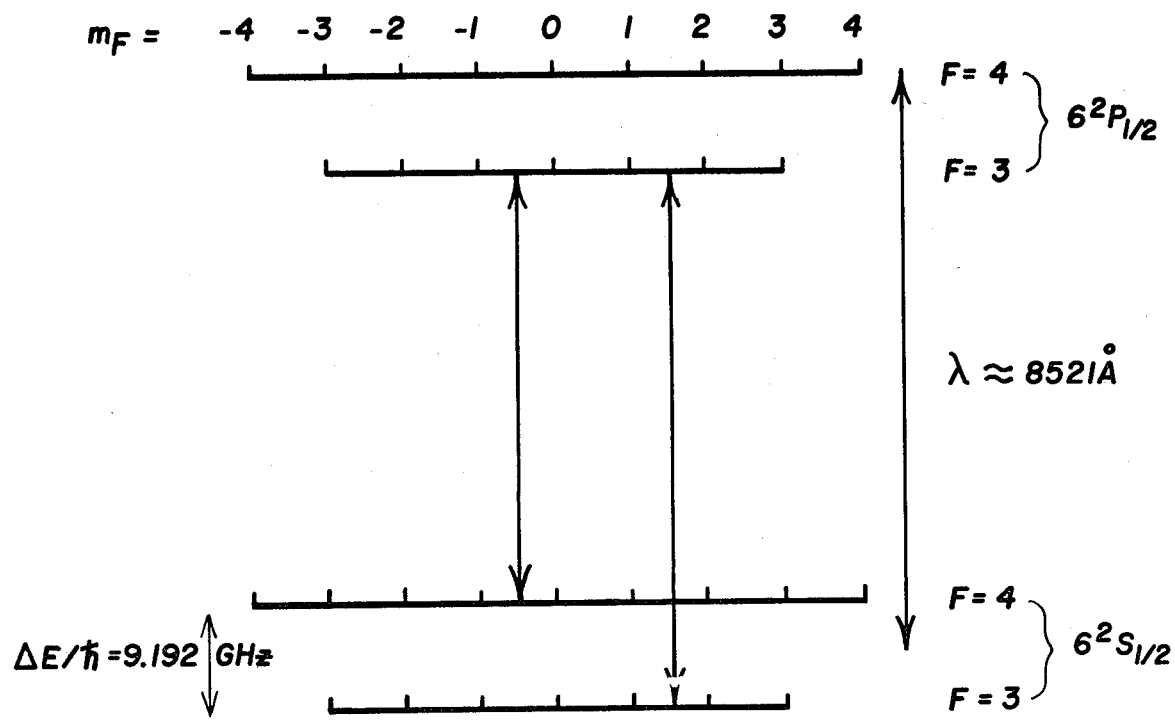
FIG. 5 illustrates an alternate choice of atomic transitions employed in accordance with the embodiment disclosed in FIG. 3.

An F=3 $m_F$=0 trap state can be produced for use in a clock as in FIG. 2 by employing laser light which is plane polarized parallel to the weak magnetic field and has lines at the two frequencies suitable for producing the excitations shown in FIG. 5. However, this embodiment has the disadvantage of producing additional trap states in the $6^2S_{\frac{1}{2}}$ F=4 $m_F$=±4 states. However, these states are substantially less populated than the $6^2S_{\frac{1}{2}}$ F=3 $m_F$=0 state so that the use of this embodiment in a cesium clock still provides significant improvement of the cesium beam tube signal to noise ratio. The "B" field and detector can be replaced with an optical pumping detection scheme if desired.

I claim:

1. A method of producing source particles in a single state, said particles being selected from the group consisting of atoms, and ions, and said method comprising the steps of:
    (a) selecting optical pumping frequencies and polarizations (i) to avoid pumping said particles out of the trap state and (ii) to pump particles in all other ground level states to at least one excited energy level from which the particles can decay into the trap state; and
    (b) illuminating the source particles with light having the selected optical pumping frequencies.

2. A method as recited in claim 1 further comprising the steps of:
    (c) forming the particles into a particle beam; and
    (d) directing the particle beam through a pumping region in which the particles are illuminated with light having the selected optical pumping frequencies.

3. A method as recited in claim 1 further comprising the step of providing a magnetic field in a pumping region which contains the source particles while they are being illuminated with said light.

4. A method as recited in claim 3 wherein the frequencies are selected to induce transitions from the hyperfine energy level containing the trap state only to other hyperfine energy levels of equal total angular momentum F and the polarization is selected to be planar with a polarization axis oriented parallel to the magnetic field.

5. An improved atomic clock of the type in which an atomic source provides atoms to which an rf field is applied to induce transitions from an initial state to a final state, in which the frequency of the rf field is regulated in response to a clock signal from a variable frequency oscillator, in which the clock signal is also provided at an output for timing purposes, and in which the rate of transitions is detected to hold the clock signal at a frequency which maximizes the rate of transitions, wherein the improvement comprises means for optically pumping the atoms into at least one excited level from which the particles can decay into a single ground level trap state before the rf field is applied to the atoms, said trap state serving as the initial atomic state in the atomic clock.

6. An improved atomic clock as recited in claim 5 wherein the means for optically pumping comprises
    a light source to illuminate the atoms with light having frequencies and polarizations which excite all atoms in ground energy level states, other than those atoms in the trap state, to an excited energy level.

7. An improved atomic clock as recited in claim 6 wherein the light source comprises a plane polarizeable laser.

8. An improved atomic clock as recited in claim 6 further comprising means for providing a magnetic field in a pumping region which contains the atoms while they are being illuminated with said light.

9. An improved ionic clock of the type in which an ionic source provides ions to which an rf field is applied to induce transitions from an initial state to a final state, in which the frequency of the rf field is regulated in response to a clock signal from a variable frequency oscillator, in which the clock signal is also provided at an output for timing purposes, and in which the rate of transitions is detected to hold the clock signal at a frequency which maximizes the rate of transitions, wherein the improvement comprises means for optically pumping the ions into a single ground level trap state before the rf field is applied to the ions, said trap state serving as the initial ionic state in the ionic clock.

10. An improved ionic clock as recited in claim 9 wherein the means for optically pumping comprises:
   means for providing a magnetic field in a pumping region containing the ions; and
   a light source to illuminate the ions in the pumping region with light having frequencies and polarizations which excite all ions in ground energy level states, other than those ions in the trap state, to an excited energy level.

11. An improved ionic clock as recited in claim 10 wherein the light source comprises a plane polarizeable laser.

12. An improved maser of the type in which atoms in an upper hyperfine sublevel of the atomic ground energy level are provided to a microwave cavity to stimulate emission of microwave frequency electromagnetic radiation from the atoms, the improvement comprising optically pumping the atoms into a trap state in said hyperfine sublevel.

* * * * *